(12) United States Patent  (10) Patent No.: US 7,259,870 B2
Arai et al.  (45) Date of Patent: Aug. 21, 2007

(54) 3-DIMENSIONAL IMAGE ACQUISITION APPARATUS AND METHOD, 3-DIMENSIONAL RECONSTRUCTION SYSTEM, AND LIGHT PROJECTION UNIT AND LIGHT PROJECTION METHOD THEREFROM

(75) Inventors: Kazuhiko Arai, Hachioji (JP); Akio Kosaka, Hachioji (JP); Takashi Miyoshi, Atsugi (JP); Kazuhiko Takahashi, Hachioji (JP); Hidekazu Iwaki, Hachioji (JP); Yasunori Ohki, Hachioji (JP)

(73) Assignee: Olympus Corporation, Tokyo (JP)

( * ) Notice: Subject to any disclaimer, the term of this patent is extended or adjusted under 35 U.S.C. 154(b) by 399 days.

(21) Appl. No.: 10/803,673

(22) Filed: Mar. 18, 2004

(65) Prior Publication Data

US 2004/0234260 A1 Nov. 25, 2004

(30) Foreign Application Priority Data

Mar. 24, 2003 (JP) ............................. 2003-080509

(51) Int. Cl.
*G01B 11/24* (2006.01)
(52) U.S. Cl. .................................... 356/601
(58) Field of Classification Search ................ 356/601, 356/610, 151, 165; 382/151, 165
See application file for complete search history.

(56) References Cited

U.S. PATENT DOCUMENTS 4,871,256 A * 10/1989 Grindon .................... 356/610
5,424,838 A * 6/1995 Siu ............................ 356/394
6,370,335 B1 4/2002 Niblett et al.
6,549,288 B1 * 4/2003 Migdal et al. .............. 356/603
2002/0118970 A1 8/2002 Miyoshi

FOREIGN PATENT DOCUMENTS

JP 2002-236332 8/2002

* cited by examiner

*Primary Examiner*—Tarifur Chowdhury
*Assistant Examiner*—Isiaka O. Akanbi
(74) *Attorney, Agent, or Firm*—Scully, Scott, Murphy & Presser, P.C.

(57) ABSTRACT

A 3-dimensional image acquisition apparatus acquires images to be used for 3-dimensionally reconstructing an object by picking up the object by a camera twice or more in an image acquisition set including picking up at least once the object carrying a pattern projected onto it by a projection light source. The apparatus comprises a light projection information memory configured to store information on projection of light including information on the time for projecting light for the purpose of projecting the pattern in the image acquisition set, an image acquisition progress information memory configured to store information on the progress of image acquisition in the image acquisition set, and a controller configured to control the projection of light by the projection light source and the picking up by the camera on the basis of the stored information on projection of light and the stored information on the progress.

2 Claims, 8 Drawing Sheets

3-DIMENSIONAL IMAGE ACQUISITION APPARATUS AND METHOD, 3-DIMENSIONAL RECONSTRUCTION SYSTEM, AND LIGHT PROJECTION UNIT AND LIGHT PROJECTION METHOD THEREFROM

CROSS-REFERENCE TO RELATED APPLICATIONS

This application is based upon and claims the benefit of priority from prior Japanese Patent Application No. 2003-080509, filed Mar. 24, 2003, the entire contents of which are incorporated herein by reference.

BACKGROUND OF THE INVENTION

1. Field of the Invention

This invention relates to a 3-dimensional image acquisition apparatus for picking up an image of an object twice or more than twice including picking up at least once an image of the object that carries a pattern projected on it for the purpose of 3-dimensionally reconstructing the object, and also to a 3-dimensional image acquisition method. The present invention also relates to a 3-dimensional reconstruction system for 3-dimensionally reconstructing an object by carrying out such an image acquisition.

The present invention further relates to a light projection unit adapted to be connected to a camera that can continuously image an object and output timing signals for defining timings of imaging or projecting light for projecting a pattern and also to a light projection method to be used for such a light projection unit.

2. Description of the Related Art

U.S. Pat. No. 6,370,335 B1 discloses a flash unit for flashing light for a number of times at predetermined regular intervals for the purpose of 3-dimensional image acquisition. The disclosed flash unit can alternately flashlight with a pattern (projection flash) and without any pattern (lighting flash) by sequentially switching the externally input flashing signals.

U.S. Pat. No. 2002/0118,970 A1 describes a stereoadaptor that enables a camera to acquire a parallax image when it is connected to the imaging optical system of the camera. The stereo adaptor is provided with a light emitting section for ligating a pattern projector for projecting a pattern onto an object or the object itself.

BRIEF SUMMARY OF THE INVENTION

According to a first aspect of the present invention, there is provided a 3-dimensional image acquisition apparatus for acquiring images to be used for 3-dimensionally reconstructing an object by picking up the object twice or more than twice in an image acquisition set including picking up at least once the object carrying a pattern projected onto it, the apparatus comprising: a camera configured to pick up the object; a projection light source configured to project light for the purpose of projecting the pattern onto the object; a light projection information memory configured to store information on projection of light including information on the time for projecting light for the purpose of projecting the pattern in the image acquisition set; an image acquisition progress information memory configured to store information on the progress of image acquisition in the image acquisition set; and a controller configured to control the projection of light by the projection light source and the picking up by the camera on the basis of the information on projection of light stored in the light projection information memory and the information on the progress stored in the image acquisition progress information memory.

According to a second aspect of the present invention, there is provided a light projection unit to be connected to a camera adapted to continuously picking up an object and output timing signals for one of the timing of picking up the object and the timing of projecting light for the purpose of projecting a pattern onto the object, the unit comprising: a projection light source configured to project light for the purpose of projecting the pattern onto the object; a light projection information memory configured to store information on projection of light including information on the time for projecting light for the purpose of projecting the pattern in the continuous picking up; an image acquisition progress information memory configured to store information on the progress of the continuous picking up; and a controller configured to control the projection of light by the projection light source in synchronism with the timing signal and on the basis of the information on projection of light stored in the light projection information memory and the information on the progress stored in the image acquisition progress information memory.

According to a third aspect of the present invention, there is provided a 3-dimensional reconstruction system for acquiring images to be used for 3-dimensionally reconstructing an object by picking up the object twice or more than twice in an image acquisition set including picking up at least once the object carrying a pattern projected onto it, the system comprising: a camera configured to pick up the object; a projection light source configured to project light for the purpose of projecting the pattern onto the object; a light projection information memory configured to store information on projection of light including information on the time for projecting light for the purpose of projecting the pattern in the image acquisition set; an image acquisition progress information memory configured to store information on the progress of image acquisition in the image acquisition set; a controller configured to control the projection of light by the projection light source and the picking up by the camera on the basis of the information on projection of light stored in the light projection information memory and the information on the progress stored in the image acquisition progress information memory; and a computer configured to 3-dimensionally reconstructing the object on the basis of the images obtained by the camera.

According to a fourth aspect of the present invention, there is provided a 3-dimensional image acquisition method for obtaining images to be used for 3-dimensionally reconstructing an object by picking up the object twice or more than twice in an image acquisition set including picking up at least once the object carrying a pattern projected onto it, the method comprising: acquiring information on projection of light including information on the time for projecting light for the purpose of projecting the pattern in the image acquisition set; storing information on the progress of image acquisition in the image acquisition set; and conducting the image acquisition set on the basis of the information on projection of light acquired in the acquiring information and the information on the progress stored in the storing information.

According to a fifth aspect of the present invention, there is provided a 3-dimensional image acquisition method for obtaining images to be used for 3-dimensionally reconstructing an object by picking up the object twice or more than twice in an image acquisition set including picking up at least once the object carrying a pattern projected onto it, the method comprising: acquiring information on projection of light including information on the time for projecting light for the purpose of projecting the pattern in the image acquisition set; storing information on the progress of image acquisition in the image acquisition set; and conducting the image acquisition, while projecting light for the purpose of projecting the pattern when the information on the progress indicates that a first imaging session is in progress.

According to a sixth aspect of the present invention, there is provided a 3-dimensional image acquisition method for obtaining images to be used for 3-dimensionally reconstructing an object by picking up the object twice or more than twice in an image acquisition set including picking up at least once the object carrying a pattern projected onto it, the method comprising: acquiring information on projection of light including information on the time for projecting light for the purpose of projecting the pattern in the image acquisition set, which time can be that of a first imaging session; storing information on the progress of image acquisition in the image acquisition set; and conducting the image acquisition, while projecting light for the purpose of projecting the pattern when the information on the progress indicates that the first imaging session is in progress.

According to a seventh aspect of the present invention, there is provided a method of projecting light from a light projection unit adapted to continuously pick up an object and project light for the purpose of projecting a pattern on the object while conducting the picking up, the method comprising: acquiring information on projection of light including information on the time for projecting light for the purpose of projecting the pattern in the continuous picking up; storing information on the progress of the continuous picking up; and projecting light for the purpose of projecting the pattern in synchronism with the picking up and on the basis of the information acquired in the acquiring information and the information on the progress stored in the storing information.

According to an eighth aspect of the present invention, there is provided a method of projecting light from a light projection unit adapted to continuously pick up an object and project light for the purpose of projecting a pattern on the object while conducting the picking up, the method comprising: acquiring information on projection of light including information on the time for projecting light for the purpose of projecting the pattern in the continuous picking up; storing information on the progress of the continuous picking up; and projecting light for the purpose of projecting the pattern in synchronism of a first session of the picking up when the information on the progress indicates that the first session is in progress.

According to a ninth aspect of the present invention, there is provided a method of projecting light from a light projection unit adapted to continuously pick up an object and project light for the purpose of projecting a pattern on the object while conducting the picking up, the method comprising: acquiring information on projection of light including information on the time for projecting light for the purpose of projecting the pattern in the continuous picking up, which time can be that of a first session of the picking up; storing information on the progress of the continuous picking up; and projecting light for the purpose of projecting the pattern in synchronism of the first session when the information on the progress indicates that the first session is in progress.

According to a tenth aspect of the present invention, there is provided a 3-dimensional image acquisition apparatus for acquiring images to be used for 3-dimensionally reconstructing an object by picking up the object twice or more than twice in an image acquisition set including picking up at least once the object carrying a pattern projected onto it, the apparatus comprising: a camera for picking up the object; projection light emission means for projecting light for the purpose of projecting the pattern onto the object; light projection information storing means for storing information on projection of light including information on the time for projecting light for the purpose of projecting the pattern in the image acquisition set; image acquisition progress information storing means for storing information on the progress of image acquisition in the image acquisition set; and control means for controlling the projection of light by the projection light emission means and the picking up by the camera on the basis of the information on projection of light stored in the light projection information storing means and the information on the progress stored in the image acquisition progress information storing means.

According to an eleventh aspect of the present invention, there is provided a light projection unit to be connected to a camera adapted to continuously picking up an object and output timing signals for one of the timing of picking up the object and the timing of projecting light for the purpose of projecting a pattern onto the object, the unit comprising: projection light emission means for projecting light for the purpose of projecting the pattern onto the object; light projection information storing means for storing information on projection of light including information on the time for projecting light for the purpose of projecting the pattern in the continuous picking up; image acquisition progress information storing means for storing information on the progress of the continuous picking up; and control means for controlling the projection of light by the projection light emission means in synchronism with the timing signal and on the basis of the information on projection of light stored in the light projection information storing means and the information on the progress stored in the image acquisition progress information storing means.

According to a twelfth aspect of the present invention, there is provided a 3-dimensional reconstruction system for acquiring images to be used for 3-dimensionally reconstructing an object by picking up the object twice or more than twice in an image acquisition set including picking up at least once the object carrying a pattern projected onto it, the system comprising: a camera for picking up the object; projection light emission means for projecting light for the purpose of projecting the pattern onto the object; light projection information storing means for storing information on projection of light including information on the time for projecting light for the purpose of projecting the pattern in the image acquisition set; image acquisition progress information storing means for storing information on the progress of image acquisition in the image acquisition set; control means for controlling the projection of light by the projection light emission means and the picking up by the camera on the basis of the information on projection of light stored in the light projection information storing means and the information on the progress stored in the image acquisition progress information storing means; and computing means for 3-dimensionally reconstructing the object on the basis of the images obtained by the camera.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The present invention will now be described in greater detail with reference to the accompanying drawing that illustrates preferred embodiments of the invention.

1st Embodiment

Figure 1:
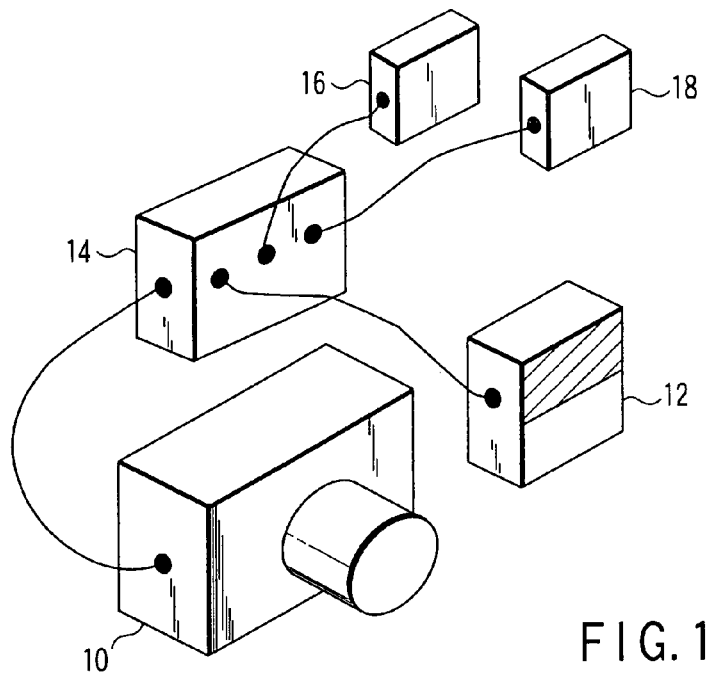
FIG. 1 is a schematic perspective view of a first embodiment of 3-dimensional image acquisition apparatus according to the invention, showing its external appearance.
Figure 2:
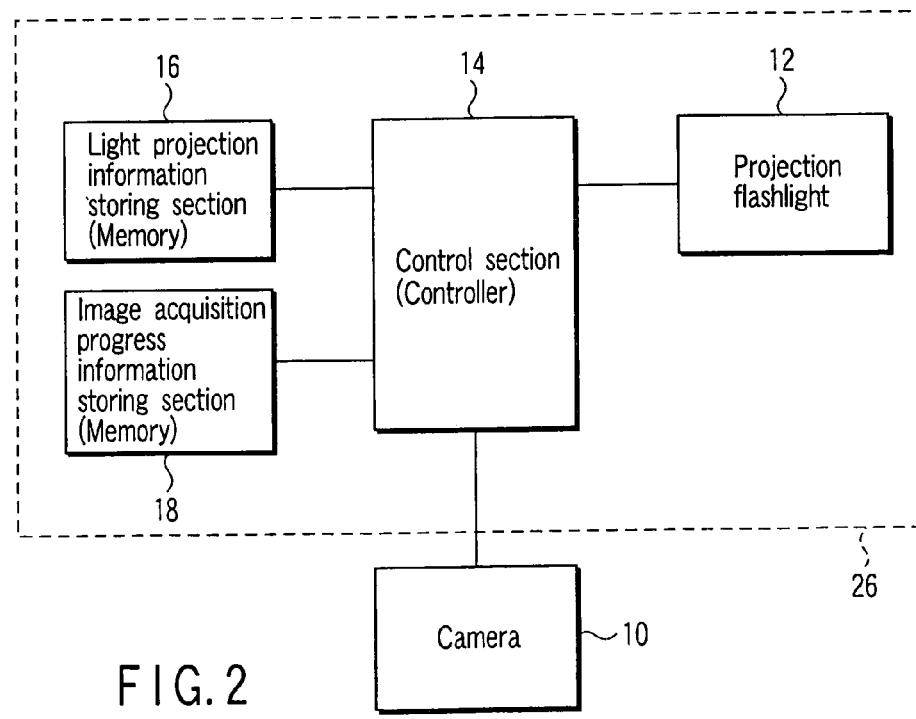
FIG. 2 is a schematic block diagram of the first embodiment of 3-dimensional image acquisition apparatus.

The first embodiment of the invention, which is a 3-dimensional image acquisition apparatus, is adapted to acquire an image by a camera and image projection on a striped pattern. As shown in FIGS. 1 and 2, the 3-dimensional image acquisition apparatus of the first embodiment comprises a camera 10, a projection flashlight 12, a control section 14, a light projection information storing section 16 and an image acquisition progress information storing section 18. The projection flashlight 12 is a projection light source for projecting a striped pattern on an object (not shown). The control section 14 is a controller that controls the camera 10 and the projection flashlight 12. The light projection information storing section 16 and the image acquisition progress information storing section 18 are connected to the control section 14. The light projection information storing section 16 is a memory that stores information on projection of light and the image acquisition progress information storing section 18 is a memory that stores information on the progress of the current image acquisition. Information on projection of light and information on the progress of the current image acquisition stored in these memories will be discussed in greater detail hereinafter.

While the positional relationship between the camera 10 and the projection flashlight 12 of this embodiment is not illustrated, the camera 10 and the projection flashlight 12 may or may not need to be retained to respective positions by certain retaining members. FIG. 1 does not define the need or non-need of retention.

More specifically, in the above configuration, a one-chip microcomputer may be used for the control section 14 and a memory may be used for the information storing sections 16 and 18. Otherwise, the above described configuration can be realized without difficulty provided that an impedance matching operation is conducted when connecting the circuit for supplying timing signals from the camera 10 and the control section 14 and the output terminal of the control section 14 to the projection flashlight 12 and the circuit for supplying power to the projection flashlight 12 is formed by using transistors or FETs, although not specifically illustrated.

Now, the operation of a 3-dimensional image acquisition apparatus having the above described configuration will be described below. In a image acquisition set where the object is imaged twice or more than twice, a timing signal is output from the camera 10 for the timing of imaging the object of the camera 10 and input to the control section 14. The control section 14 causes the projection flashlight 12 to project light for the purpose of projecting a pattern onto the object in synchronism with the timing signal on the basis the light projection information stored in the light projection information storing section 16 and the image acquisition progress information stored in the image acquisition progress information storing section 18. As a result of the image acquisition set conducted in the above described manner, images necessary for 3-dimensionally reconstructing the object are obtained and the obtained images include an image of the object onto,which the pattern is projected.

"The progress information" stored in the image acquisition progress information storing section 18 include the elapsed time since the start of the current image acquisition, the ordinal number of the ongoing imaging session in the image acquisition set and other pieces of information that show the current status of the current image acquisition that is in progress. The progress information is updated as the image acquisition operation proceeds.

"The light projection information" stored in the light projection information storing section 16 includes information corresponding to the data that show when the projection flashlight 12 projects light for the purpose of projecting the pattern onto the object. For example, information relating to the camera 10 may include the selected imaging mode, selection or non-selection of the continuous imaging function, ON or OFF of the power source, the remaining capacity of the storage medium or image memory, the selected type of 3-dimensional image acquisition, the exposure conditions, the shutter speed, the F value, the selected values for focusing, the selected values for zooming, the remaining power of the battery, information telling if the camera is writing an image or not, information on operation errors, the form or type of the camera, etc. Information relating the projection light source include information telling if the light source (flashlight) is emitting light properly or not, the remaining power of the battery, ON or OFF of the power source, information telling if the charging is completed or not, information on the photo meter, the type, the guide number, information on the bouncing feature, the duration of projection or light emission, information on operation errors, etc. "The data showing the time when the projection flashlight 12 projects light for the purpose of projecting the pattern onto the object" may exactly refer to the data showing the time when the projection flashlight 12 projects light for the purpose of projecting the pattern onto the object or, alternatively may refer to the data to be used for selecting a desired projection mode out of predetermined several projection modes (data on the time when the projection flashlight 12 projects light for the purpose of projecting the pattern onto the object). The light projection information storing section 16 may store several projection modes.

It may be so arranged that the control section 14 outputs the above mentioned timing signal and the camera 10 picks up an image upon receiving the timing signal. The timing signal may not necessarily be a signal telling when an imaging session is to be conducted. Alternatively, it may be a signal telling when light is projected to project the pattern onto the object or when the flashlight emits light.

Figure 3:
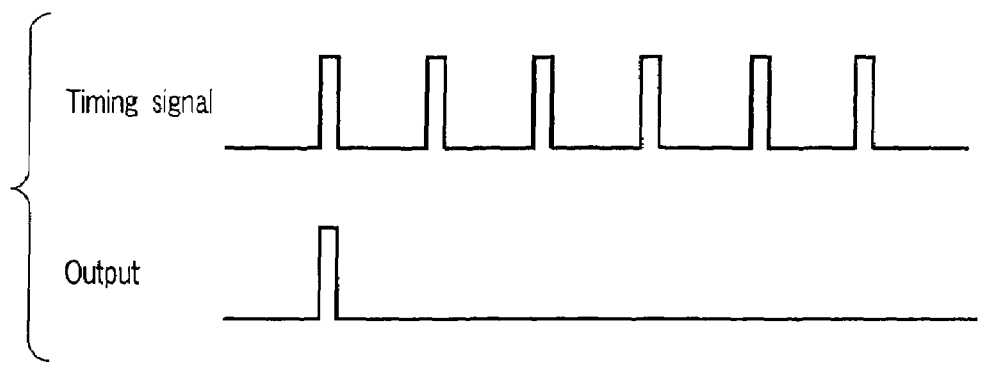
FIG. 3 is a timing chart that illustrates the relationship between the timing signal transmitted from the camera to the control section and the output of the control section for causing the projection flashlight to project a pattern.

FIG. 3 is a timing chart that illustrates the relationship between the timing signal transmitted from the camera 10 to the control section 14 and the output of the control section 14 for causing the projection flashlight 12 to project the pattern. Note that, in the case of the timing chart of FIG. 3, the projection flashlight 12 is caused to project light for the purpose of projecting the pattern onto the object in synchronism with the timing signal on the basis of the light projection information and the progress information only in the first imaging session. While positive logic is used for both the input and the output in FIG. 3, negative logic may alternatively be used for both or either one of the input and the output.

Figure 4:
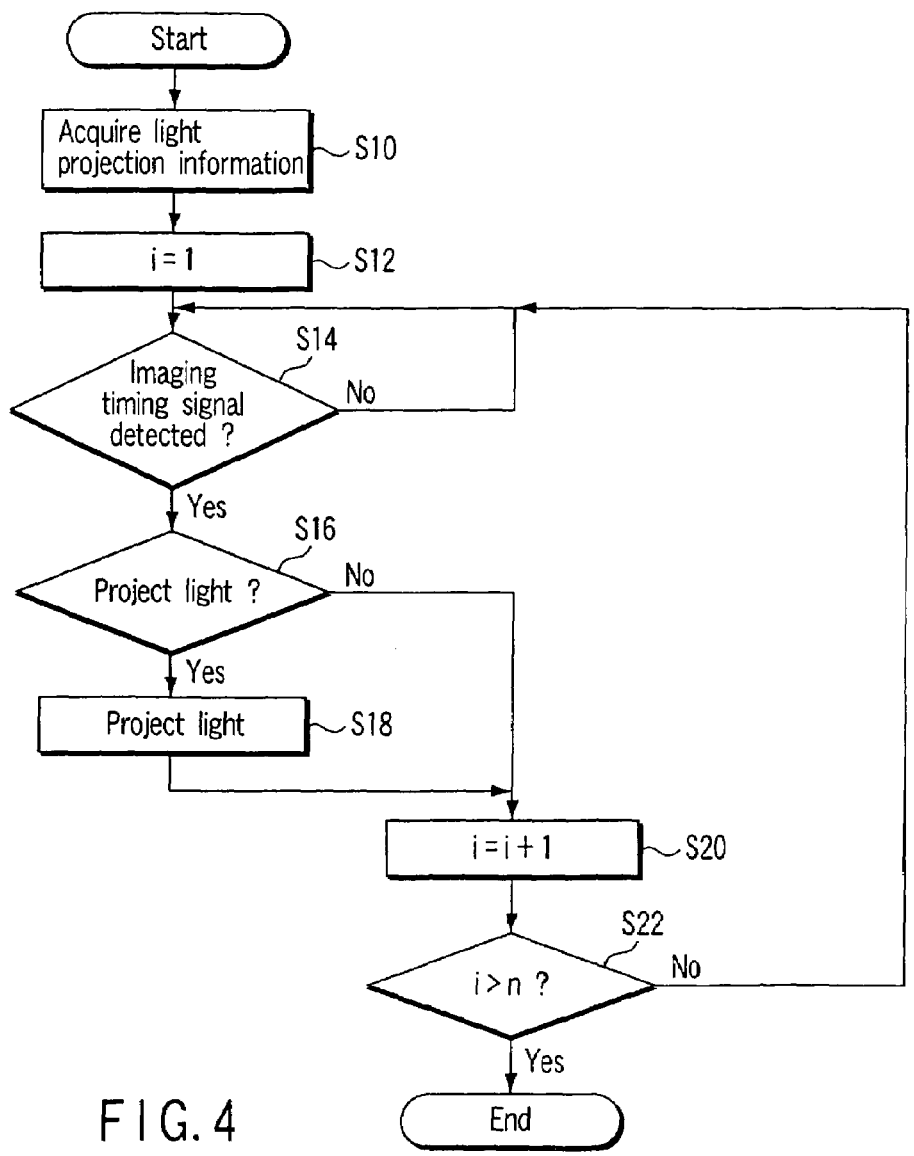
FIG. 4 is a flow chart of operation of the first embodiment.

FIG. 4 is an exemplar flow chart of operation of the first embodiment when the projection flashlight 12 is caused to project light for the purpose of projecting the pattern onto the object in synchronism with the timing signal on the basis of the light projection information and the progress information.

Referring to FIG. 4, the control section 14 acquires the light projection information stored in the light projection information storing section 16 (Step S10). Then, it stores i=1 as image acquisition progress information (assuming that the i-th imaging session is conducted in an image acquisition set) in the image acquisition progress information storing section 18 (Step S12).

Then, it receives an imaging timing signal from the camera 10 (Step S14) and determines if it needs to cause the projection flashlight 12 to project light onto the object or not on the basis of the light projection information and the progress information (Step S16). If, as a result, it is determined that it needs to cause the projection flashlight 12 to project light, it does so for the purpose of projecting the pattern onto the object (Step S18). If, on the other hand, it should not cause the projection flashlight 12 to project light, it does not do so and allows the camera 10 to pick up an image (although not shown in the flow chart because the camera 10 picks up an image by itself).

Thereafter, the control section 14 updates the progress information by overwriting i=i+1, which is then stored in the image acquisition progress information storing section 18 (Step S20). Subsequently, it determines if the image acquisition set including n imaging sessions is over (i>n) or not (Step S22). If it is determined that the image acquisition set is not over, the control section 14 returns to Step S14 and repeats the above steps. If, on the other hand, it is determined that the image acquisition set including n imaging sessions is over (Step S22), it terminates the image acquisition.

The light projection information may be stored in advance in the light projection information storing section 16 or externally input by some means. The progress information may be information showing the ordinal number of the imaging session that has been conducted last or the time that has passed since the start of the image acquisition set. The light projection information storing section 16 and the image acquisition progress information storing section 18 may be incorporated in the control section 14. The progress information may be stored in the primary storage in the control section 14.

The overwriting of the progress information is not limited to the step shown in the flow chart. The progress information may be overwritten at any appropriate step depending on the type of information to be used for overwriting.

The control section 14 causes the projection flashlight 12 to project light for the purpose of projecting the pattern onto the object at a desired timing in synchronism with the timing signal output from the camera on the basis of the light projection information and the progress information. In this way, images for 3-dimensional reconstruction of the object including an image of the object onto which the pattern is projected can be acquired by the 3-dimensional image acquisition apparatus.

While this embodiment only has the projection flashlight 12 for projecting a striped pattern, it may additionally comprise an illumination light source (illumination flashlight 20) and/or some other light source (other flashlight 22). Illumination flashlight 20 that can be used for this embodiment include a flashlight for ordinary imaging that are used for picking up images for the purpose of mapping texture information for a prepared 3-dimensional model and a projection auxiliary flashlight that are used as auxiliary means for preventing shadows from being cast onto the object when projecting the pattern. The illumination flashlight 20 and other flashlight 22 are also connected to the control section 14. It may be so arranged that, as in the case of projection flashlight 12, the illumination flashlight 20 and other flashlight 22 are driven to illuminate the object or otherwise emit light to the latter at a desired timing in synchronism with the timing signal output from the camera on the basis of the light projection information and the progress information under the control of the control section 14.

Figure 6:
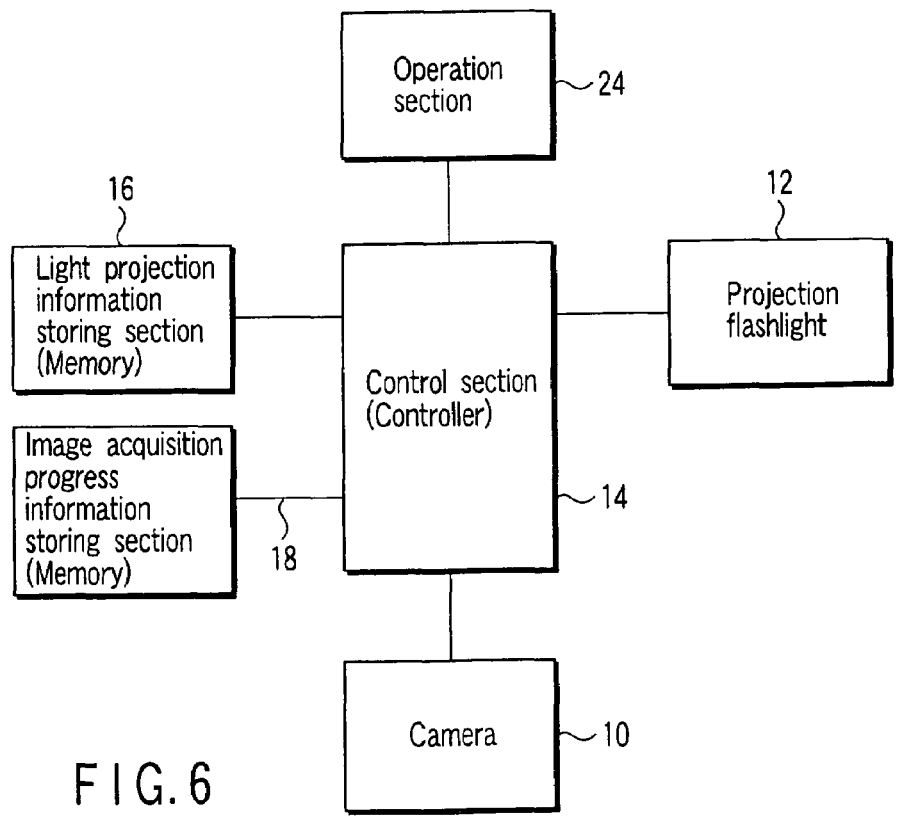
FIG. 6 is a schematic block diagram of another 3-dimensional image acquisition apparatus obtained by modifying the first embodiment.

As shown in FIG. 6, an operation section 24 may additionally be provided so that the operator may externally input light projection information. "The light projection information" as used here may be same as the above mentioned light projection information. The operator can input data telling when the projection flashlight 12 projects light for the purpose of projecting the pattern onto the object by the operation section 24, which may typically be a rotary dip switch. Alternatively, it may be so arranged that a desired light projection mode can be selected out of several light projection modes.

Furthermore, it may be so arranged that the illumination flashlight 20 and other flashlight 22 are driven to illuminate the object or otherwise emit light to the latter simultaneously when the projection flashlight 12 projects light. With this arrangement, it is possible to project light or illuminate an object from both left and right simultaneously so as to suppress any shadow that is unnecessary for the imaging operation to be cast on the object. As in the case of the projection flashlight 12, the light projection information storing section 16 may be made to store information on the time when the illumination flashlight 20 and the other flashlight 22 project light onto the object. Furthermore, the illumination flashlight 20 and the other flashlights 22 may be so arranged that they illuminate or project light onto the object on the basis of the image acquisition progress information and the light projection information.

The time when the projection flashlight 12 projects light for the purpose of projecting the pattern onto the object is determined typically from the viewpoint as described below.

For example, an image of the object that is picked up while a known pattern is being projected on the object is a very unique image and hence the computer can automatically recognize that "the image of the object is an image that is picked up while a pattern is being projected onto the object" in the image processing operation of the computer. Therefore, if it is known that an image acquisition set for picking up images necessary for 3-dimensional reconstruction always starts with an imaging session in which a pattern image is picked up (an image is picked up while the pattern is being projected onto the object) and the number of imaging sessions in an image acquisition set is also known, it is possible to extract the images picked up in the imaging operation out of a large number of images picked up by the camera 10 and recorded respectively with serial numbers. If some of the given number of images that are supposed to exist between an extracted pattern image and the next extracted pattern image are missing, it will be possible to obtain additional information telling that the image acquisition set was faulty.

Assume that the object of imaging is a person, for instance, the so-called red-eye effect can adversely affect the images that are obtained when flashes are used for the imaging operation. Pre-emission processing is generally used to prevent the red-eye effect from taking place. When the first imaging session is accompanied by projection of light, using the projection flashlight, the projection flashlight that is used for the first imaging session can also operate for pre-emission if the second and the succeeding imaging sessions are conducted while the object is illuminated by the illumination (ordinary) flashlight. The image that is picked up in the imaging session using the projection flashlight is mainly used for intermediate processing in the operation of 3-dimensional reconstruction. Therefore, if the image picked up in the imaging session using the projection flashlight shows the red-eye effect, the finished final 3-dimensional image will be acceptable if the images obtained by using ordinary flashes for texture mapping do not show any red-eye effect. Thus, such an imaging operation is effective so long as the image that shows the red-eye effect does not adversely affect the acquisition of distance information as intermediate processing in the operation of 3-dimensional reconstruction. When the acquisition of distance information is regarded as more important than texture mapping for 3-dimensional reconstruction, the above image sequence may be reversed.

When imaging an object that is moving relative to the camera, it may be so arranged that an image acquisition set includes three imaging sessions and the second imaging session is conducted for imaging the object, while projecting light for the purpose of projecting the pattern onto the object, whereas the first and third imaging sessions are conducted without projecting the pattern. Alternatively, it may be so arranged that the first and third imaging sessions are conducted for imaging the object, while projecting light for the purpose of projecting the pattern onto the object, whereas the second imaging session is conducted without projecting the pattern. Two combinations between an image obtained while projecting light for the purpose of projecting the pattern onto the object and an image obtained without projecting the pattern will be obtained in either case. The combination that shows less displacement of the relative position of the object and hence less discrepancy in the texture mapping data and the distance information obtained by the image acquisition operation will be selected from the two combinations. With this arrangement, suitable images for 3-dimensional reconstruction can be obtained if the object is moving relative to the camera.

Many effects and advantages can be obtained by conducting a series of imaging sessions according to a predefined sequence depending on the types of images necessary for 3-dimensional reconstruction. However, the object of the present invention is not to provide such effects and advantages but to show the effectiveness of defining the sequence of imaging sessions and projecting light by a projection flashlight at a desired timing that depends on the defined sequence for the purpose of projecting a pattern onto the object.

This embodiment can further modified in the following manner.

While the flashlights (12, 20, 22) are connected to the control section 14 by way of wires, they may be alternatively wirelessly connected to the control section 14. The connection between the camera 10 and the control section 14 may also be so arranged.

Light projection information is stored in the light projection information storing section 16 in advance or input by the operator by the operation section 24 in the above description. However, it may alternatively be so arranged as to acquire various pieces of information relating to the environment of image acquisition operation, the apparatus and the system, which are then input as light projection information.

Additionally, it is also possible to combine the control section 14, the projection flashlight 12, the light projection information storing section 16 and the image acquisition progress information storing section 18 into a single flash unit 26 as shown in FIG. 2. The flash unit 26 can be driven to operate in the above-described manner when connected to a camera 10 that is adapted to pick up images of the object continuously and output timing signals. Then, the flash unit 26 may be additionally provided with an operation section 24 and/or an illumination light source (illumination flashlight 20) and other light sources (other flashlight 22).

Figure 7:
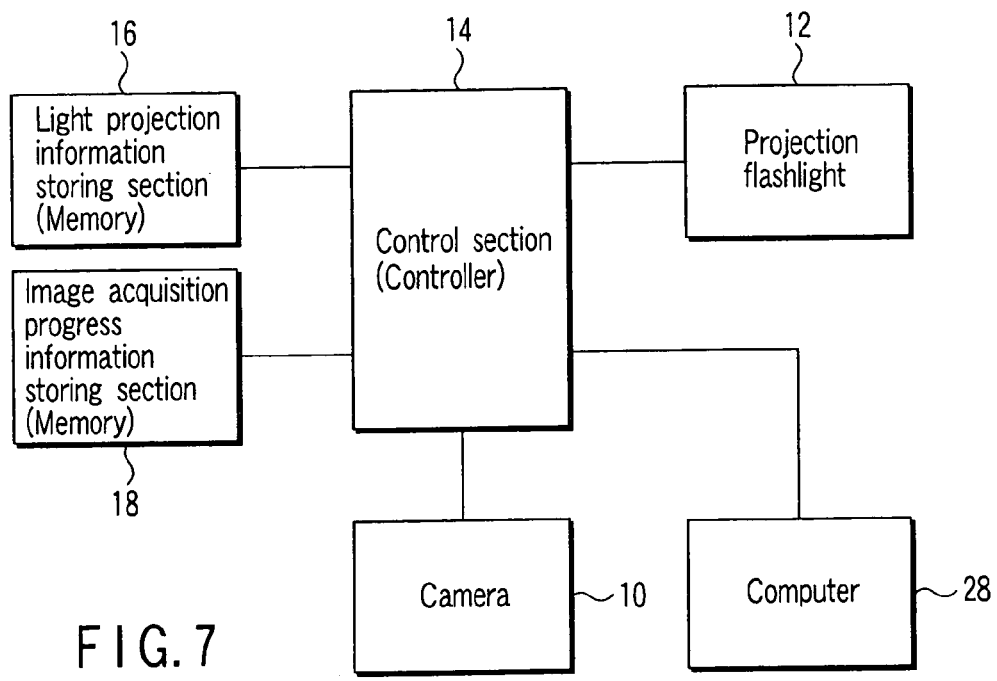
FIG. 7 is a schematic block diagram of a 3-dimensional reconstruction system using the first embodiment of 3-dimensional image acquisition apparatus, illustrating the system configuration.

As shown in FIG. 7, a computer 28 that is adapted to use the images obtained by an image acquisition set to perform 3-dimensional reconstruction may be connected to a 3-dimensional image acquisition apparatus according to this embodiment in order to realize a 3-dimensional reconstruction system.

The pattern to be projected is not limited to a striped pattern. In other words, it is not objected to any limitations and may be, for example, a random dot pattern. The colors to be used for the pattern are not objected to any limitations either. In other words, the pattern may be a color pattern or a grey pattern. Flashlight to be used for this embodiment is not limited to visible light. In other words, the types of flashlight are not limited, and visible light, infrared rays, ultraviolet rays or some other rays may alternatively be used depending on the purpose of image acquisition. Then, however, the sensitive wavelength range of the camera 10 needs to be selected correspondingly.

It is possible to cause the camera 10 to transmit various pieces of information to the control section 14 in addition to timing signals necessary for image acquisition operations. For example, the camera 10 may be adapted to transmit information on the type of the camera 10 so that, when the camera 10 does not match the flash unit 26, the flash unit is prohibited from operating so that no 3-dimensional image acquisition operation may take place. The camera 10 may additionally be so adapted as to transmit information necessary to determine if the requirements for an image acquisition set are satisfied or not. Such information may include the remaining capacity of the image recording medium of the camera 10, the remaining power of the battery and so on. Various pieces of information may be transmitted from the camera 10 and the types of information are not particularly limited for the purpose of the present invention.

2nd Embodiment

The second embodiment of the present invention will now be described with reference to FIG. 2. Throughout the accompanying drawings that illustrate the preferred embodiments and the embodiments obtained by modifying the preferred embodiments, the same or equivalent components are denoted respectively by the same reference symbols.

In the second embodiment, the control section 14 causes the projection flashlight 12 connected to it to project light for the purpose of projecting a pattern onto an object on the basis of the light projection information, including information on the light source of projected light that relates to the output from the projection flashlight 12. The control section 14 exchanges information with the projection flashlight 12. If the second embodiment comprises flashlights other than the projection flashlight 12, the control section 14 may also exchange information with some or all of the flashlights. Information to be exchanged is information on the light source for projection that may include information telling if the light source (flashlight) is emitting light properly or not, the remaining power of the battery, ON or OFF of the power source, information telling if the charging is completed or not, information on the photo meter, the type, the guide number, information on the bouncing feature, the duration of projection or light emission, information on operation errors, etc. There are no limitations to the types of information.

With this arrangement, the control section 14 can cause the projection flashlight 12 to project light for the purpose of projecting a pattern onto the object at an appropriate timing, accurately identifying the projection flashlight that is connected to it and hence available.

Figure 5:
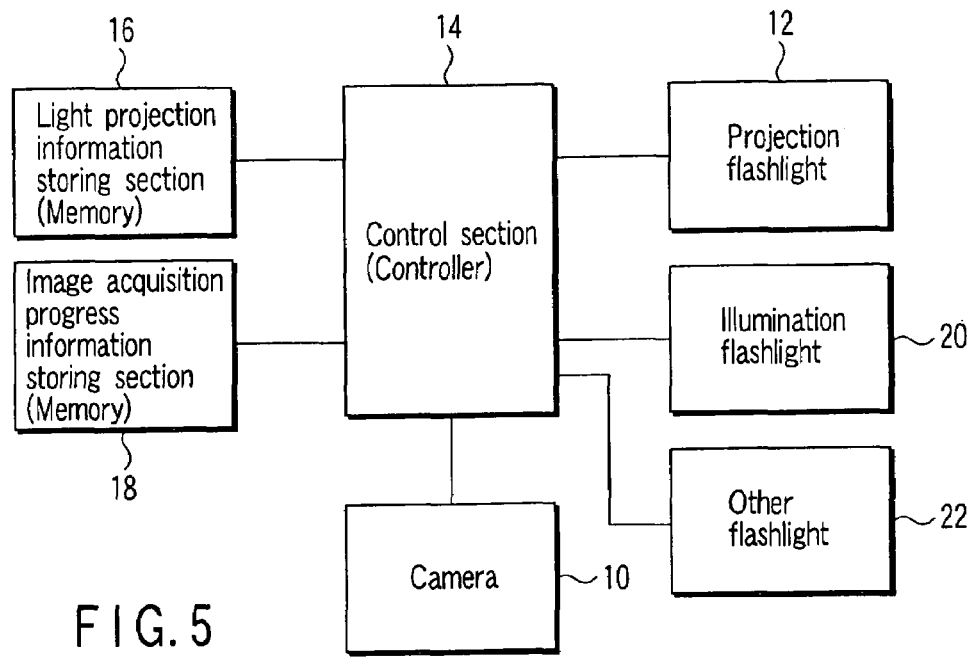
FIG. 5 is a schematic block diagram of a 3-dimensional image acquisition apparatus obtained by modifying the first embodiment.

This embodiment comprises only one projection flashlight 12 as shown in FIG. 2, and only one projection light source information output from the projection flashlight 12, used as light projection information in the above description. However, if the embodiment additionally comprises an illumination flashlight 20 and other flashlight 22 as shown in FIG. 5, the light source information obtained from the illumination flashlight 20 and the other flashlight 22 such as the illumination light source information from the illumination flashlight may also be used as light projection information.

Additionally, the timing at which each of the illumination flashlight 20 and the other flashlight 22 illuminates the object may be determined in a manner as described above for the projection flashlight 12. Assume, for example, that a total of five flashlights are connected to the control section 14 and three of them are not necessary for the current 3-dimensional image acquisition. Then, the supply of power to the unnecessary flashlights is cut and it will be known from the information on the ON and OFF states of the flashlights and the types of the activated flashlights that the types of obtainable 3-dimensional image acquisition are limited. In other words, light projection modes that correspond to respective imaging sequences will be defined not by five flashlights but by only two flashlights. Hence, the number of light projection modes will be limited accordingly. When the embodiment is so configured as to comprise an operation section 24 as shown in FIG. 6, the operator can select a desired light projection mode out of the limited number of light projection modes by the operation section 24. It is also possible to limit the number of appropriate light emitting sequence to one. Then, the only one light projection mode is automatically selected without requiring the operator to select the mode. With such processing, meaningless light projection modes are automatically eliminated and the operator can reliably obtain a 3-dimensional image without committing any error.

In this embodiment, it is also possible to combine the control section 14, the projection flashlight 12, the light projection information storing section 16 and the image acquisition progress information storing section 18 into a single flash unit 26 as in the case of the first embodiment. Additionally, also as in the case of the first embodiment, a computer 28 that is adapted to use the images obtained by an image acquisition set to perform 3-dimensional reconstruction may be connected to the embodiment of 3-dimensional image acquisition apparatus in order to realize a 3-dimensional reconstruction system.

3rd Embodiment

Now, the third embodiment of the present invention will be described with reference to FIG. 2. In the third embodiment, the control section 14 causes the projection flashlight 12 to project light for the purpose of projecting a pattern onto an object on the basis of the light projection information including information relating to the camera 10 connected to it and output from the camera 10. The information relating to the camera 10 may include the selected imaging mode, selection or non-selection of the continuous imaging function, ON or OFF of the power source, the remaining capacity of the storage medium or image memory, the selected type of 3-dimensional image acquisition, the exposure conditions, the shutter speed, the F value, the selected values for focusing, the selected values for zooming, the remaining power of the battery, information telling if the camera is writing an image or not, information on operation errors, the form or type of the camera, etc. There are no limitations to the types of information.

The control section 14 determines the time when it causes the projection flashlight 12 to project light for the purpose of projecting the pattern onto the object on the basis of the light projection information including information relating to the camera. With this arrangement, it is possible to pick up images of the object with ease under appropriate conditions without any risk of failure attributable to the camera 10.

This embodiment may be so arranged that the control section 14 determines the time when it causes the projection flashlight 12 to project light for the purpose of projecting the pattern onto the object not only on the camera-related information but also on the light projection information including projection light source information or illumination light-source information as in the case of the second embodiment. As a result of exchanging such information, a light projection mode that satisfies the requirements arising from the camera 10 and those arising from the light source can be selected so that the operation of 3-dimensional image acquisition can be conducted easily without failure.

Like the second embodiment, this embodiment can be modified in various different ways. For example, it may be modified so as to additionally comprise desired light sources as shown in FIG. 5 or an operation section 24 as shown in FIG. 6.

In this embodiment, it is also possible to combine the control section 14, the projection flashlight 12, the light projection information storing section 16 and the image acquisition progress information storing section 18 into a single flash unit 26 as in the case of the first embodiment. Additionally, also as in the case of the first embodiment, a computer 28 that is adapted to use the images obtained by an image acquisition set to perform 3-dimensional reconstruction may be connected to the embodiment of 3-dimensional image acquisition apparatus in order to realize a 3-dimensional reconstruction system.

4th Embodiment

Figure 8:
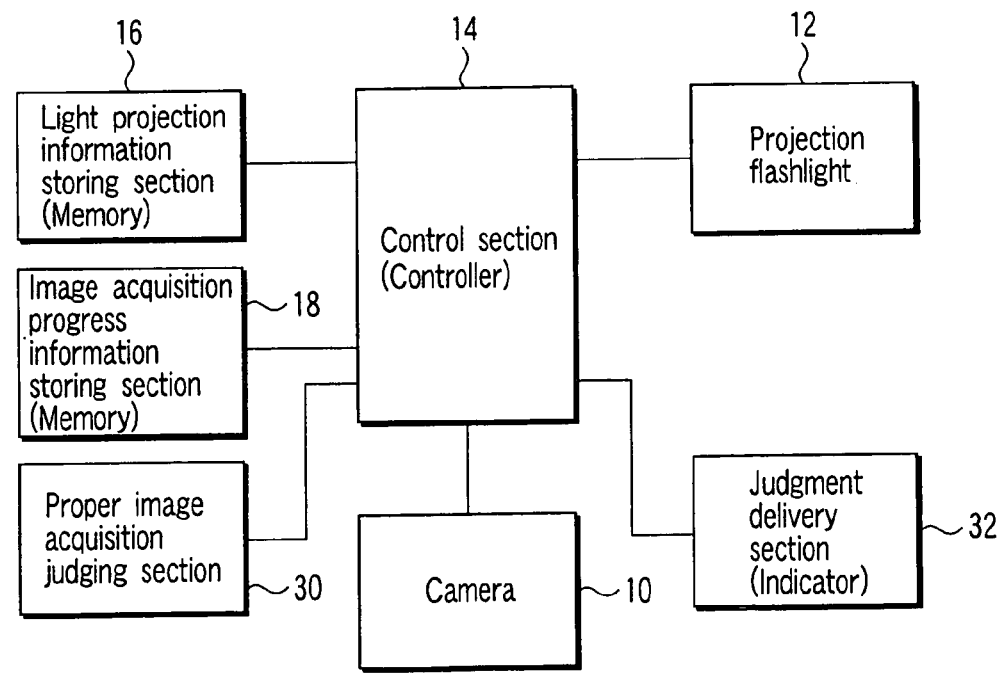
FIG. 8 is a schematic block diagram of a fourth embodiment of 3-dimensional image acquisition apparatus according to the invention.

Now, the fourth embodiment of the present invention will be described with reference to FIG. 8. In the fourth embodiment, a projection flashlight 12 for projecting a pattern onto the object similar to the one described above with reference to the first embodiment is also connected to the control section 14. The description on the connection to the camera 10 given above for the first embodiment is also applicable to this embodiment. Like the first embodiment, other pieces of information are also given to the flashlight. As shown in FIG. 8, this embodiment of 3-dimensional image acquisition apparatus additionally comprises a proper image acquisition judging section 30 and a judgment delivery section 32. The proper image acquisition judging section 30 determines if a 3-dimensional image acquisition can be properly conducted or if a 3-dimensional image acquisition has been properly conducted on the basis of light projection information. The judgment delivery section 32 shows the judgment when the proper image acquisition judging section 30 does not determine that the image acquisition in question is a proper one.

With this arrangement, when the timing of projecting light that is determined for a desired 3-dimensional image acquisition on the basis of the light projection information does not match the image acquisition conditions including the shutter speed and the exposure selected at the camera 10, the proper image acquisition judging section 30 can determine that it is not appropriate to carry out the image acquisition. Then, it is possible to issue a warning prompting a user to modify the image acquisition conditions of the camera 10 or change the selected light projection mode by way of the judgment delivery section 32.

The light projection information may include projection light source information or illumination light source information as in the case of the second embodiment. Projection light source information and illumination light source information are similar to those described above with reference to the second embodiment. Thus, the proper image acquisition judging section 30 can make judgment, using information telling if the dimming effect of each of the flashlights gives rise to over exposure, under exposure or some other abnormal exposure or not. In short, it can judge if a proper image acquisition can be conducted or has been conducted on the basis of information on the operation of the projection light source, the illumination light source and the other light sources.

The light projection information may include camera information, which may be similar to the one described above with reference to the third embodiment. Thus, the proper image acquisition judging section 30 can determine in advance if the probability of failure of the image acquisition that is going to take place is high or not on the basis of various pieces of information such as the selected imaging mode of the camera 10, selection or non-selection of the continuous imaging function, the remaining power of the battery, the remaining capacity of the image memory, the shutter speed, the F value, the selected values for focusing, the selected values for zooming and so on.

It is also possible for the proper image acquisition judging section 30 to determine not prior to an image acquisition but at the time when the image acquisition is completed or partly over if the operation has been properly conducted or not. For example, the imaging timing signals may be observed by a timer (not shown) to determine if the time intervals of the timing signals are appropriate for 3-dimensional image acquisition or not. For example, the time interval between the first timing signal and the second timing signal is determined to be appropriate if the time interval between the first imaging session when the pattern is projected onto the object and the second imaging session when the illumination flashlight is used for ordinary imaging does not exceed about 33 msec that is short enough for disregarding any movement and/or deformation of the object.

Alternatively, the proper image acquisition judging section 30 may determine if the image acquisition can be or has been conducted properly or not on the image acquisition progress information that tells, for example, if the image acquisition set has been completed within a predetermined period of time since the start of the image acquisition. The judgment is then shown at the judgment delivery section 32. It may be needless to say that the judgment delivery section 32 can show the judgment regardless of whether the image acquisition is appropriate or not.

The definition of the information and the criteria of judgment according to which the appropriateness or inappropriateness of the image acquisition is determined can vary depending on the format of the 3-dimensional image acquisition operation to be conducted, the type of the camera to be used, the type of the flashlight to be used and so on. The present invention does not provide any limitations to the criteria of judgment.

The judgment delivery section 32 may deliver the judgment in any form such as change of light, sound, color or profile produced by a buzzer, an LED, an LCD or a popping up motion of a mechanical member. The present invention does not provide any limitations to the form of delivery of the judgment.

In this embodiment, it is also possible to combine the control section 14, the projection flashlight 12, the light projection information storing section 16, the image acquisition progress information storing section 18, the proper image acquisition judging section 30 and the judgment delivery section 32 into a single flash unit 26. This embodiment may additionally comprise an operation section 24 like the modified embodiment of the second embodiment. Additionally, also as in the case of the first embodiment, a computer 28 that is adapted to use the images obtained by an image acquisition set to perform 3-dimensional reconstruction may be connected to the embodiment of 3-dimensional image acquisition apparatus in order to realize a 3-dimensional reconstruction system.

5th Embodiment

Figure 9:
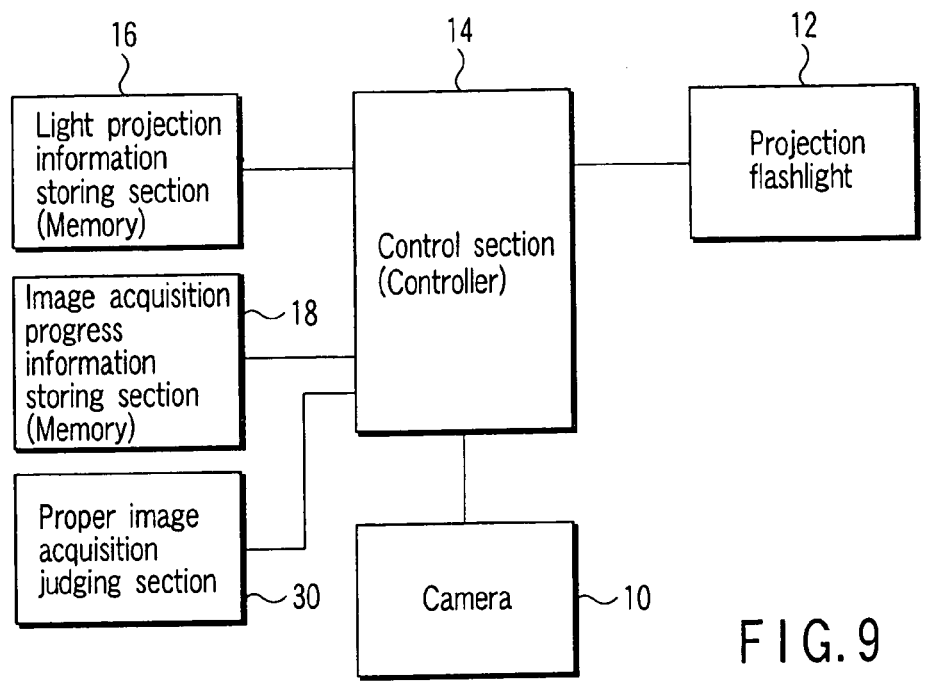
FIG. 9 is a schematic block diagram of a fifth embodiment of 3-dimensional image acquisition apparatus according to the invention.

The fifth embodiment of the present invention will now be described with reference to FIG. 9. In the fifth embodiment, a projection flashlight 12 for projecting a pattern onto an object is connected to the control section 14 as in the case of the above-described first embodiment. The mode of connection with the camera 10 is also similar to that of the first embodiment so that various pieces of information are given to the flashlight. However, this embodiment of a 3-dimensional image acquisition apparatus additionally comprises a proper image acquisition judging section 30 that determines if a 3-dimensional image acquisition can be properly conducted or if a 3-dimensional image acquisition has been properly conducted on the basis of light projection information. The control section 14 is so designed that, when the proper image acquisition judging section 30 determines that the current 3-dimensional image acquisition is not appropriate, it resets the image acquisition progress information storing section 18 so that the progress information necessary for the first imaging session is stored in it and the image acquisition can be restarted regardless if the embodiment is in an imaging session that includes projection of a pattern onto the object that is necessary for a 3-dimensional image acquisition operation.

The proper image acquisition judging section 30 judges in a manner as described below. In a case where a plurality of picked up images of an object including an image picked up after projecting a pattern onto the object are used for 3-dimensional configuration, the object, which may be a person, can move between two consecutive imaging sessions if the intervals of the imaging sessions are greater than a certain value. Then, as a result, adverse effects can arise. For example, the precision of the profile of the object in the 3-dimensionally reconstructed image can be degraded and/or the texture mapping data that are to be applied to the 3-dimensionally reconstructed image and the profile data (distance information) can show positional discrepancies. Therefore, it is desirable that the intervals of the imaging timing signals output from the camera 10 or the control section 14 are smaller than a predetermined value. It is safe to say that an ideal 3-dimensional image cannot be obtained when the intervals are at least smaller than the duration of a single video frame, or 33 msec. Taking the camera shake that can occur when the camera 10 is held by hand without using a tripod, the influence of zooming with a high magnifying ratio and other factors into consideration, the judgment on image acquisition that is made on the basis of the intervals of imaging timing signals will be reasonable. From the above-described viewpoint, the proper image acquisition judging section 30 sequentially observes the intervals of the imaging timing signals typically by a timer (not shown). If the intervals exceed a reference value, which may be 33 msec as described above, the proper image acquisition judging section 30 determines that the current image acquisition is inappropriate and the control section 14 resets the image acquisition progress information storing section 18 according to the judgment so that the progress information necessary for the first imaging session is stored in the storing section.

With this arrangement, it is possible to avoid in advance a problem that the operator does not properly conduct an image acquisition set and hence a satisfactory 3-dimensionally reconstructed image cannot be obtained when an image processing operation for 3-dimensionally reconstructing the object is carried out on the basis of the picked up images. Additionally, since the operator will notice quickly that the current image acquisition set is not conducted satisfactorily, he or she can quickly restart the imaging operation and conduct it properly.

Figure 10:
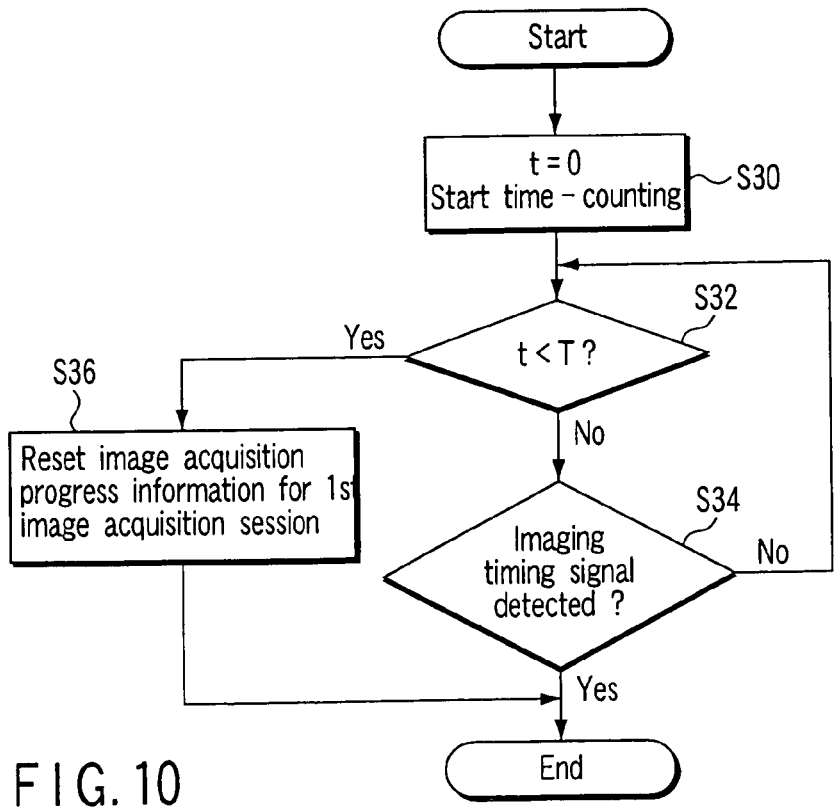
FIG. 10 is a flow chart of the operation of the proper image acquisition judging section for judging for OK or N.G. imaging and that of the control section for resetting on the basis of the judgment.

FIG. 10 is a flow chart of the operation of the proper image acquisition judging section 30 for judging for OK or N.G. image acquisition, using a timer, and that of the control section 14 for resetting on the basis of the judgment. Referring to FIG. 10, the proper image acquisition judging section 30 starts time-counting after the end of a previous imaging session (Step S30). Then, it determines if an imaging timing signal is input within predefined time interval T or not by the loop of Steps S32 and S34. In other words, it determines if the counted time t is greater than the predefined time T or not (Step S32) and, if the counted time t is not greater than the predefined time T, it then determines if an imaging timing signal is input or not (Step S34). If no imaging timing signal is input, the proper image acquisition judging section 30 returns to Step S32. If, on the other hand, an imaging timing signal is input, the proper image acquisition judging section 30 terminates the processing of the flow chart.

If no imaging timing signal is input within predefined time interval T and the proper image acquisition judging section 30 determines that the counted time t is greater than the predefined time T (Step S32), the control section 14 rewrites the progress information stored in the image acquisition progress information storing section 18 so as to store progress information necessary for the first imaging session in it (Step S36) and then terminates the processing of the flow chart.

Description will be given on the relevance of a timing chart to this processing, with reference to FIG. 11. While positive logic is used for both the input and the output in FIG. 11, negative logic may alternatively be used for both or either one of the input and the output. For the purpose of simplicity, it is assumed here that only the projection flashlight 12 is connected to the control section 14 and arranged so as to project light for the purpose of projecting a pattern onto the object in synchronism with the first imaging session in an image acquisition set.

Figure 11:
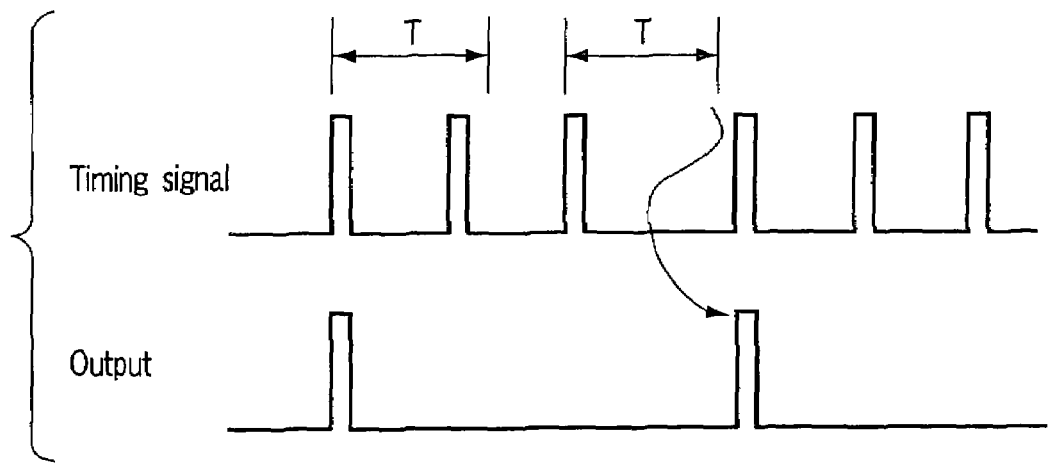
FIG. 11 is a timing chart that illustrates the relationship between the timing signal transmitted-from the camera to the control section and the output of the control section.

FIG. 11 shows that the first three timing signals for image acquisition are input at predefined regular time intervals of T and, after a time interval that follows the third timing signal and is longer than the predefined time interval of T, another three timing signals are input again at the predefined time intervals of T. According to the time count of the timer, the first three timing signals are input to satisfy the requirement of the predefined time interval of T. Therefore, the projection flashlight 12 only projects light in synchronism with the first imaging session for the purpose of projecting the pattern onto the object. However, the time interval between the third timing signal and the fourth timing signal is longer than the predefined time interval T. Therefore, the fourth imaging session is judged to be improper and hence the control section 14 resets the image acquisition progress information for the first imaging session. Thus, the projection flashlight 12 projects light in synchronism with the fourth imaging session for the purpose of projecting the pattern onto the object.

The above description applies to a situation where the input of the timing signal is delayed because of an error on the part of the equipment. However, the control section 14 resets the image acquisition progress information storing section 18 to improve the image acquisition efficiency in occasions as described below. For example, such occasions may include a case where the object moves remarkably in an image acquisition set necessary for 3-dimensional reconstruction and the operator notices the movement of the object and spontaneously suspends the image acquisition. Then, if the operator restarts the image acquisition after a certain period of time, he or she can proceed with the image acquisition without problem because the control section 14 resets the image acquisition progress information storing section 18.

It may be needless to say that this embodiment can also be modified in various different ways like the second and third embodiments. For example, the light projection information may include projection light source information, illumination light source information and/or information on some other light sources described in the above second embodiment. The description of light source information given above with reference to the second embodiment also applies here. Thus, the proper image acquisition judging section 30 can make judgment, using information telling if the dimming effect of the projection flashlight 12 gives rise to over exposure, under exposure or some other abnormal exposure or not. In short, it can judge if a proper image acquisition can be conducted or has been conducted on the basis of information on the operation of each of the flashlights.

As described above with reference to the third embodiment, the light projection information may include camera information, which may be similar to the one described above with reference to the third embodiment. Thus, the proper image acquisition judging section 30 can determine in advance if the probability of failure of the image acquisition that is going to take place is high or not on the basis of various pieces of information such as the selected imaging mode of the camera 10, selection or non-selection of the continuous imaging function, the remaining power of the battery, the remaining capacity of the image memory, the shutter speed, the F value, the selected values for focusing, the selected values for zooming and so on.

This embodiment may be combined with the fourth embodiment so that the proper image acquisition judging section 30 determines if the image acquisition can be or has been conducted properly or not. If it is determined by the proper image acquisition judging section 30 that the image acquisition cannot be or has not been conducted properly, the judgment delivery section 32 shows the judgment and the control section 14 resets the image acquisition progress information storing section 18 so that the progress information necessary for the first imaging session is stored in it. With this arrangement, if the current image acquisition set is not being conducted properly, the operator can easily notice the situation and can quickly restart the image acquisition and conduct it properly and efficiently.

In this embodiment, it is also possible to combine the control section 14, the projection flashlight 12, the light projection information storing section 16, the image acquisition progress information storing section 18 and the proper image acquisition judging section 30 into a single flash unit 26. This embodiment may additionally comprise an operation section 24 like the modified embodiment of the described above embodiment. Additionally, also as in the case of the first embodiment, a computer 28 that is adapted to use the images obtained by an image acquisition set to perform 3-dimensional reconstruction may be connected to the embodiment of 3-dimensional image acquisition apparatus in order to realize a 3-dimensional reconstruction system.

6th Embodiment

Figure 12:
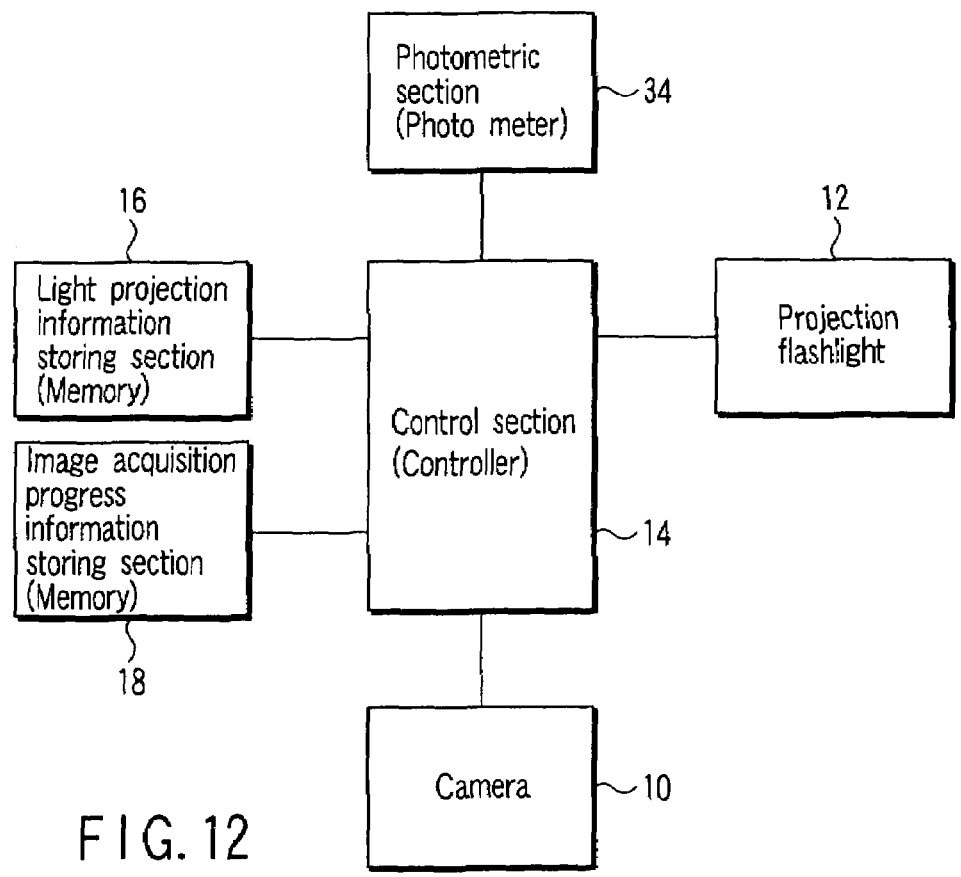
FIG. 12 is a schematic block diagram of a sixth embodiment of 3-dimensional image acquisition apparatus according to the invention.

The sixth embodiment of the present invention will now be described with reference to FIG. 12. The sixth embodiment is similar to the first embodiment but additionally comprises a photometric section 34. The control section 14 causes the projection flashlight 12 to project light for the purpose of projecting a pattern onto the object on the basis of light projection information including the luminance information obtained by the photometric section 34.

The photometric section 34 may be realized by a phototransistor or a CCD. The sensitivity wavelength band that can be sensed by the photometric section 34 may be appropriately selected depending on the operating environment and the type of flashlight of the embodiment. Thus, the photometric section 34 may be adapted to sense infrared rays, visible rays or ultraviolet rays of light and meter both or either of the luminance of environmental light surrounding the 3-dimensional image acquisition apparatus and that of light projected from the projection flashlight 12.

The control section 14 determines the time when it causes the projection flashlight 12 to project light for the purpose of projecting the pattern onto the object on the basis of the light projection information including luminance information. With this arrangement, it is possible to acquire images of the object with ease under appropriate conditions.

Of course, the light projection information may include not only luminance information but also projection light source information, illumination light source information and camera information as in the case of the preceding embodiments.

Figure 13:
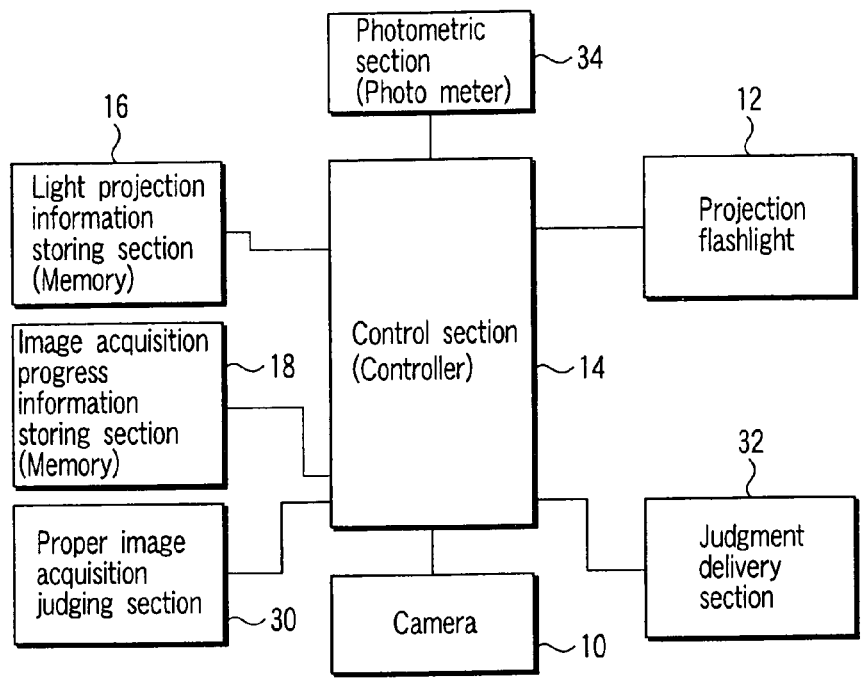
FIG. 13 schematic block diagram of a 3-dimensional image acquisition apparatus obtained by modifying the sixth embodiment.
Figure 14:
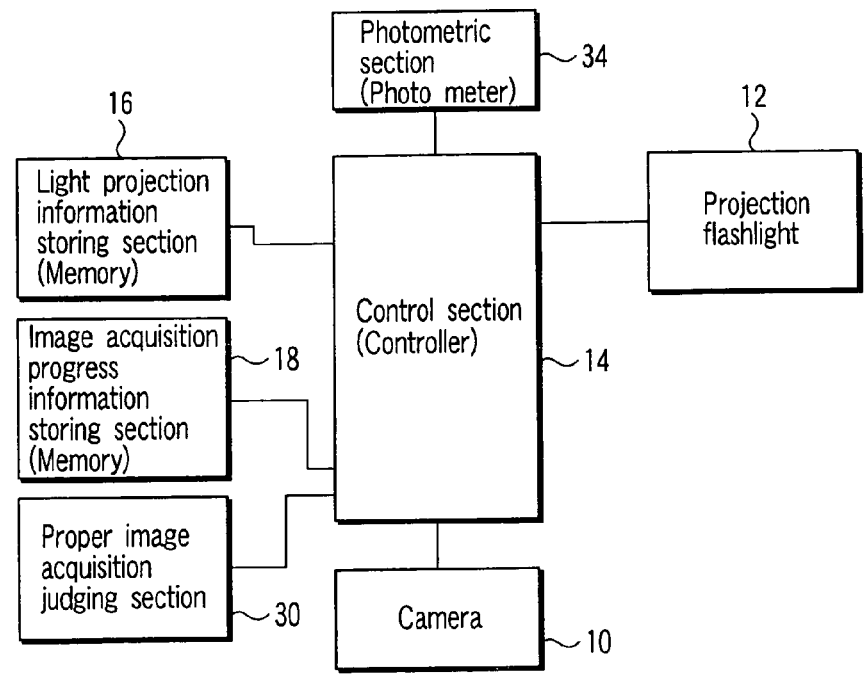
FIG. 14 is a schematic block diagram of another 3-dimensional image acquisition apparatus obtained by modifying the sixth embodiment.

Each of the above described fourth and fifth embodiments may be made to have a configuration as shown in FIG. 13 or 14 so that the proper image acquisition judging section 30 determines if the current image acquisition is proceeding proper or not on the basis of the light projection information including the luminance information obtained from the photometric section 34. Then, the judgment will be more reliable because it is based on information including luminance information. Additionally, the proper image acquisition judging section 30 can give a more detailed judgment relating to the exposure conditions that involve the use of external light and/or the projection flashlight on the basis of light projection information including luminance information. Because of the provision of a photometric section 34, the luminance information on each of a plurality of flashlights can be obtained by a common sensor particularly when information on the dimming effect of each of the flashlights including the projection flashlight 12 cannot be obtained. Hence, the system can be constructed at low cost.

In this embodiment, it is also possible to combine the control section 14, the projection flashlight 12, the light projection information storing section 16, the image acquisition progress information storing section 18 and the photometric section 34 into a single flash unit 26. This embodiment may additionally comprise an operation section 24 like the modified embodiment of the described above embodiment. Additionally, also as in the case of the first embodiment, a computer 28 that is adapted to use the images obtained by an image acquisition set to perform 3-dimensional reconstruction may be connected to the embodiment of 3-dimensional image acquisition apparatus in order to realize a 3-dimensional reconstruction system.

7th Embodiment

Figure 15:
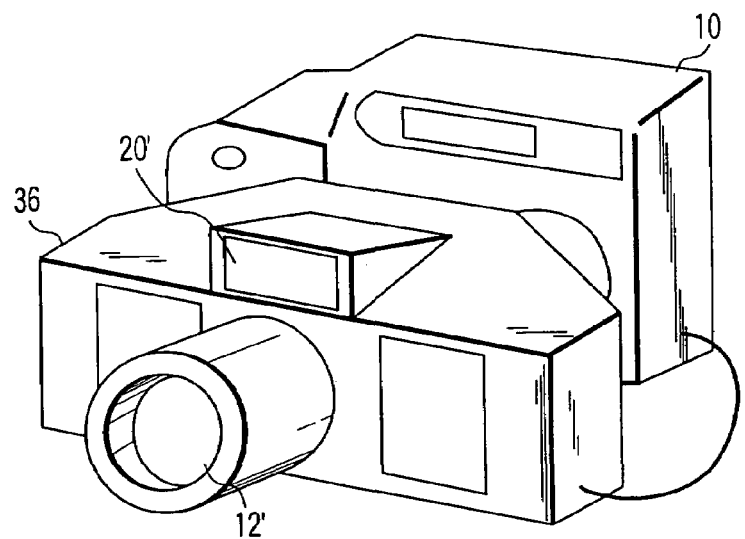
FIG. 15 is a schematic perspective view of a seventh embodiment of 3-dimensional image acquisition apparatus according to the invention, showing its external appearance.
Figure 16:
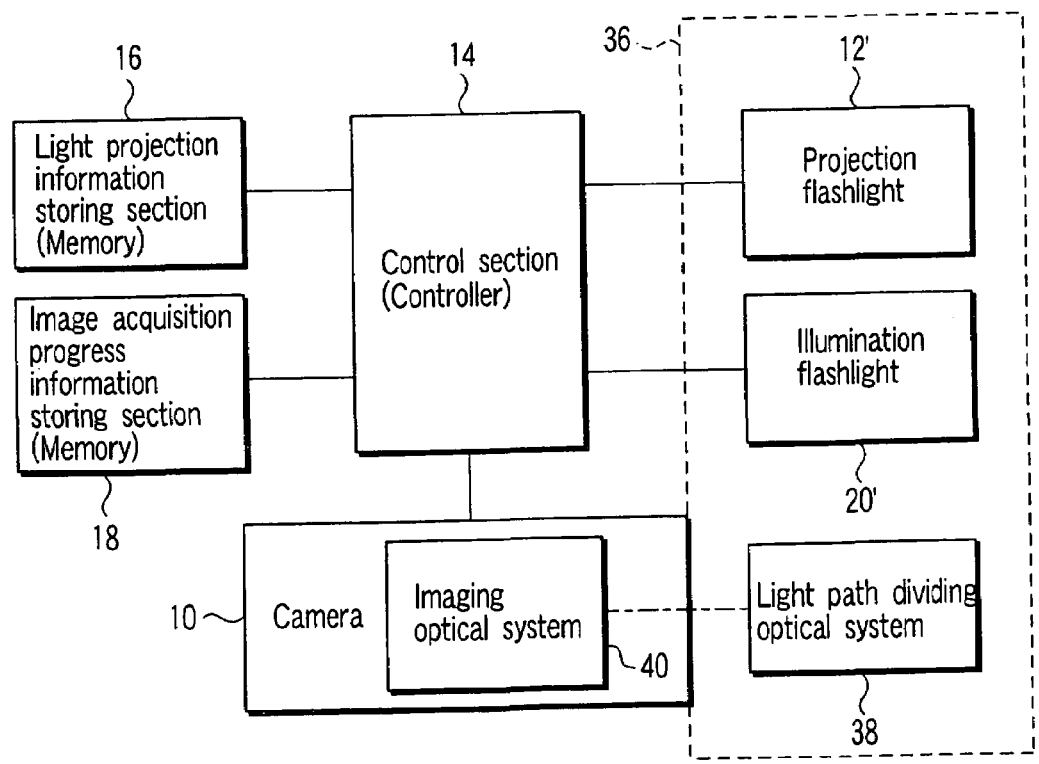
FIG. 16 is a schematic block diagram of the seventh embodiment of 3-dimensional image acquisition apparatus.

The seventh embodiment of the present invention will now be described with reference to FIGS. 15 and 16. All of the above-described first through sixth embodiments can take the form of a stereo-adaptor 36 relative to the camera 10 as shown in FIG. 15. Such a stereo-adaptor 36 is disclosed, for example, in U.S. Pat. No. 2002/0118970 A1. More specifically, images of an object as viewed from a plurality of different angles can be obtained at a time when the stereo-adaptor 36 is connected to the single imaging optical system 40 of the camera 10 by way of a light path dividing optical system 38.

The stereo adaptor of this embodiment contains a projection flashlight 12' that is adapted to project light for the purpose of projecting a random dot pattern onto the object and an illumination flashlight 20', which are integrally incorporated in the stereo adaptor. Note that the illumination flashlight 20' may be omitted.

The stereo-adaptor 36 may comprise a control section 14, a light projection information storing section 16 and an image acquisition progress information storing section 18 as well as an operation section 24, a proper image acquisition judging section 30, a judgment delivery section 32 and a photometric section 34, which are described above with reference to some of the preceding embodiments and modified embodiments.

The camera 10 and the stereo-adaptor 36 are connected to each other both electrically and mechanically so that they can input and output imaging timing signals.

In a 3-dimensional image acquisition that uses the stereo-adaptor 36, the projection flashlight 12' having an optical system for projecting a random dot pattern and the illumination flashlight 20' project light at desired timings for image acquisition set once power is supplied to the camera 10 and the control section 14. In this way, it is possible to obtain images necessary for 3-dimensional reconstruction of the object including an image carrying a pattern projected onto it by the above described 3-dimensional image acquisition apparatus.

More specifically, a depth image is obtained by using a parallax image obtained by picking up the object, projecting a random dot pattern onto it. Then, a 3-dimensional image of the object is obtained by texture-mapping the images obtained by using an ordinary flashlight (illumination flashlight 20') relative to the depth image.

The image acquisition set is conducted normally in a continuous imaging mode where the camera 10 is driven to take pictures approximately at a rate of 3 pictures per second. Thus, a 3-dimensional image is obtained without being significantly influenced by any shake on the part of the object if the object is a person. No delay is involved in the operation of obtaining stereo pair images showing parallax when a stereo-adaptor is used for 3-dimensional image acquisition so that it is possible to acquire highly reliable distance information. Of the images picked up in an image acquisition set, the effort for acquiring distance information is not adversely affected if the images obtained by using a flashlight (illumination flashlight 20') reveal shakes to a slight extent.

The imaging sequence of an image acquisition set using a stereo-adaptor 36 may be the same as the one described above. More specifically, an image acquisition set including extraction of a pattern image by image processing can be handled advantageously when a pattern is projected onto the object always at the first imaging session.

From the viewpoint of the time necessary for recharging the flashlight with electrical charge, the advantage of projecting a pattern onto the object at the first imaging section is remarkable. Because the images necessary for 3-dimensional reconstruction are obtained by using an optical system including a film for projecting a pattern, a sufficiently large quantity of light is required when projecting light by a flashlight. As a result, the time required until the flashlight is completely recharged is relatively long if compared with the time required for recharging the flashlight for some other flashing operation. Therefore, if the projection flashlight 12' is always used for projecting a pattern at the first imaging session and the image acquisition set is started after confirming that the projection flashlight 12' for projecting a pattern is fully recharged, it is possible to reliably avoid any imaging failure due to an insufficient time for recharging the projection flashlight 12'. If an image carrying a pattern projected onto it needs to be obtained for a number of times in an image acquisition set, it is possible to repeat the cycle of imaging the object carrying a pattern projected by the projection flashlight with a sufficient time margin if the projection flashlight 12' is always used for projecting the pattern at the first imaging session, which is followed by a number of imaging sessions using some other flashlight.

Additionally, in this embodiment, a computer 28 that is adapted to use the images obtained by an image acquisition set to perform 3-dimensional reconstruction may be connected to the control section in order to realize a 3-dimensional reconstruction system.

While flashlights are used as (projection, illumination) light sources in the above description of the embodiments and modified embodiments, the light sources are not limited to flashing light sources such as flashlights and lights provided with a projector or a shutter may alternatively be used.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalent.

What is claimed is:

1. A 3-dimensional image acquisition apparatus for acquiring images to be used for 3-dimensionally reconstructing an object by picking up the object twice or more than twice in an image acquisition set including picking up at least once the object carrying a pattern projected onto it, the apparatus comprising:

a camera configured to pick up the object;
a projection light source configured to project light for the purpose of projecting the pattern onto the object;

a light projection information memory configured to store information on projection of light including information on the time for projecting light for the purpose of projecting the pattern in the image acquisition set;

an image acquisition progress information memory configured to store information on the progress of image acquisition in the image acquisition set;

a controller configured to control the projection of light by the projection light source and the picking up by the camera on the basis of the information on projection of light stored in the light projection information memory and the information on the progress stored in the image acquisition progress information memory;

a proper image acquisition judging section configured to judge the appropriateness of the image acquisition that one of that is being conducted and has been conducted on the basis of one of the information on projection of light and the information on the progress; and an indicator configured to show the judgment result of the proper image acquisition judging section.

2. A 3-dimensional image acquisition apparatus for acquiring images to be used for 3-dimensionally reconstructing an object by picking up the object twice or more than twice in an image acquisition set including picking up at least once the object carrying a pattern projected onto it, the apparatus comprising:

a camera configured to pick up the object;

a projection light source configured to project light for the purpose of projecting the pattern onto the object;

a light projection information memory configured to store information on projection of light including information on the time for projecting light for the purpose of projecting the pattern in the image acquisition set;

an image acquisition progress information memory configured to store information on the progress of image acquisition in the image acquisition set;

a controller configured to control the projection of light by the projection light source and the picking up by the camera on the basis of the information on projection of light stored in the light projection information memory and the information on the progress stored in the image acquisition progress information memory; and a proper image acquisition judging section configured to judge the appropriateness of the image acquisition that one of that is being conducted and has been conducted on the basis of one of the information on projection of light and the information on the progress, wherein the controller is adapted to reset the image acquisition progress information memory so as to make it store the progress information necessary for a first imaging session when the proper image acquisition judging section determines that the current image acquisition is not appropriate.

* * * * *